(12) United States Patent
Pettersson et al.

(10) Patent No.: US 10,789,556 B2
(45) Date of Patent: Sep. 29, 2020

(54) SELF CONTROL

(71) Applicant: HEXAGON TECHNOLOGY CENTER GMBH, Heerbrugg (CH)

(72) Inventors: Bo Pettersson, Luxembourg (LU); Håkan Andersson, Karlskoga (SE); Jonas Wedin, Karlskoga (SE)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 596 days.

(21) Appl. No.: 15/466,724

(22) Filed: Mar. 22, 2017

(65) Prior Publication Data

US 2017/0278028 A1 Sep. 28, 2017

(30) Foreign Application Priority Data

Mar. 22, 2016 (EP) ...................................... 16161770

(51) Int. Cl.
*G06Q 10/06* (2012.01)

(52) U.S. Cl.
CPC ..... *G06Q 10/0631* (2013.01); *G06Q 10/0639* (2013.01); *G06Q 10/063112* (2013.01)

(58) Field of Classification Search
CPC ................................ G06Q 40/06; G06Q 10/00
USPC ................................................ 705/7.11–7.12
See application file for complete search history.

(56) References Cited

U.S. PATENT DOCUMENTS

| | | | |
|---|---|---|---|
| 8,543,603 B2* | 9/2013 | Boris ...................... | G06Q 10/10 705/2 |
| 9,406,039 B2* | 8/2016 | Reed .............. | G06Q 10/063118 |
| 9,424,545 B1* | 8/2016 | Lee ................ | G06Q 10/063114 |
| 9,783,952 B2* | 10/2017 | Nagato ................. | E02F 9/2285 |
| 10,204,388 B2* | 2/2019 | Fosburgh ......... | G06Q 10/06312 |
| 2004/0117361 A1* | 6/2004 | Greer .................. | G06F 16/2228 |

(Continued)

FOREIGN PATENT DOCUMENTS

| | | |
|---|---|---|
| CN | 103020755 A | 4/2013 |
| CN | 104156812 A | 11/2014 |

(Continued)

OTHER PUBLICATIONS

Minnesota Department of Transportation (MDT) "Work Package Creation and Maintenance Process", Minnesota Department of Transportation, Mar. 2015, pp. 1-23 (Year: 2015).*

(Continued)

*Primary Examiner* — Romain Jeanty

(74) *Attorney, Agent, or Firm* — Maschoff Brennan

(57) ABSTRACT

The invention relates to a construction site management system and a method for providing checking instructions on a mobile device of a worker on a construction site, wherein the mobile device is connected to a server as part of the construction site management system, wherein work packages are assigned to the worker by the server. The method includes obtaining a progress report from the worker relating to the progress of a work package, and transmitting the progress report to the server, retrieving a checking plan from the server based on the progress report, and generating checking instructions based at least in part on the checking plan, the checking instructions comprising information on what feature to check, where to check the feature, and directives on how to check the feature.

17 Claims, 4 Drawing Sheets

(56) References Cited

U.S. PATENT DOCUMENTS

| | | | |
|---|---|---|---|
| 2006/0044307 A1* | 3/2006 | Song | G06Q 10/06 345/419 |
| 2007/0080149 A1 | 4/2007 | Albrecht et al. | |
| 2008/0030461 A1 | 2/2008 | Matsui et al. | |
| 2008/0100570 A1 | 5/2008 | Friedrich et al. | |
| 2008/0229313 A1* | 9/2008 | Motoyama | G06F 9/54 718/102 |
| 2012/0251996 A1 | 10/2012 | Jung | |
| 2013/0038633 A1 | 2/2013 | Maggiore | |
| 2013/0132440 A1* | 5/2013 | Carlson | G06Q 10/06 707/792 |
| 2013/0326322 A1* | 12/2013 | Chaubey | G06Q 10/06311 715/221 |
| 2014/0229212 A1* | 8/2014 | MacElheron | G06Q 10/063114 705/7.15 |

FOREIGN PATENT DOCUMENTS

| | | |
|---|---|---|
| CN | 105303308 A | 2/2016 |
| CN | 105303640 A | 2/2016 |
| CN | 105335559 A | 2/2016 |
| EP | 2 629 210 A1 | 8/2013 |
| JP | 2001-239983 A | 9/2001 |

OTHER PUBLICATIONS

Extended European Search Report dated Sep. 1, 2016 as received in Application No. 16161770.9.

* cited by examiner

SELF CONTROL

FIELD OF THE INVENTION

The present invention relates to a method for construction site management, to a construction site management system and to a computer program product for the same.

BACKGROUND

The present invention pertains to a construction site management system for a construction site and to a method for retrieving and managing data related to the current state of a construction site, the data being assigned particularly to locations of the construction site. The data comprise instructions regarding measurement tasks at the site.

In the art of general construction work such as building construction and civil engineering, planning, progress observation, as well as instruction and documentation distribution are important key factors. In many instances, those aspects are getting more and more complex and dynamic, in particular due to the many parties and data involved, fluctuating human and/or objective resources, increased complexity and amount of the interim or end results, tighter schedules, increased costs of human resources, etc. Work that was formerly planned and observed by one manager is nowadays too complex for a single person and splitting the jobs and assigning them to multiple people often fails due to a mismanagement of interfaces.

Therefore, it has been tried to expand automation and computerization in this technical field. For example, in the art of building construction, EP 2 629 210 is giving an example of a so called BIM (building information model) system.

In view of the demand for flexible and efficient usage of executing entities, and in view of the demand for increased efficiency or often practiced real time replacement and spare management of structural and human resources, methods and systems going further than the standard human usage of computer and mobile devices are demanded.

Also, the documentation demands are increased, e.g. by the project manager, by the contractors or suppliers for proving flawlessness, by insurances, by government bodies, for settlement of damages, for handling compensation claims, to enforce due contractual penalties, for commissioning, etc.

As being common nowadays, constructions sites are managed with help of a computer based system, wherein data of various kinds are collected on servers and shareable throughout a user network.

In particular, a site manager is enabled by said system to coordinate and spread jobs such as work packages and measuring instructions from his office through the network to the workers and craftsmen who receive the jobs with a mobile device wirelessly connected to the system/servers.

Because the system is reliant on said manager, who additionally may not always be available, and his decisions and/or assignments, real-time responses by the management system to new circumstances at any given time are impossible. Also, the manager needs to dispose of a wide knowledge about literally everything the database of the managing system cannot provide.

SUMMARY

Some embodiments provide an improved method for providing checking instructions on a mobile device within a construction management system. Other embodiments relate to an improved construction management system for a construction site, while others relate to an improved computer program product for a construction management system.

At least one of these improvements is achieved by the method according to claim 1, the system according to claim 8, the computer program product according to claim 15, and/or the dependent claims of the present invention.

A popular approach gaining ever more acceptance in construction is the increase of self-responsibility and self-regulation. In both science and in practice it has been shown that the principles of decentralisation can have beneficial impact on the outcome providing a more manageable construction system. The invention described in the following takes advantage of said approach.

The invention relates to a method and a system that allow the inspection of construction site elements, particularly after the completion of a work package, by providing information for a worker, the information comprising measuring instructions, the provision of said information being based on parameters from a database and/or from a user input. The worker or craftsman has a mobile device such as a tablet PC or smart phone which may be wirelessly connected to a server having a database.

With the method and the system according to the invention, an automatic assignment and distribution of measuring tasks and measuring subtasks, each task or subtask particularly having measuring instructions, to the operators (workers) involved in a construction is made possible. For these actions, decisions have to be found under consideration of several aspects (or technically speaking: parameters), which are either known from the database server or from indications entered into the system by the operator.

Firstly, it is recorded which work package currently is or has been executed and more particularly what progress has been made of said current work package. For this, the operator marks down in the system how far he proceeded with the planned work. If for example a work package comprises several work steps and the work steps comprise several sub-steps, and so on, the system, in which all the work packages are stored, may provide user interface means for checking each one said (sub-) steps.

Moreover, measuring tasks are stored on the server and linked to work packages, after whose completion they shall be accomplished. Through this correlation the system outputs the correct measuring task based on which specific work packages or work (sub) steps have been done.

Furthermore, the server has implemented a real-time updated list of measuring instruments with an assigned location within the construction site. For identification the instruments may have an identification number. The registering in the database may be realised in an automated way by each instrument comprising a positioning unit, or instruments may registered with their locations manually by the craftsmen on their mobile device connected to the server. Further attributes, such as on condition, measuring range, weight, size or measurement parameter, may be linked to the instrument identification number as well.

Knowledge about the skill or professional qualification regarding the use of respective instruments is stored in a database as well, provided and made accessible by a server. As it is commonly known within companies, specifically who does possess which knowledge about how to use which tool or measuring instrument, such data, for example in form of a spreadsheet, may be stored on said server and logically linked to the system according to the invention. In another embodiment, said information on the worker's qualification is stored by further attributes being linked to the measuring instrument identification number.

Depending on the skill or professional qualification of a respective craftsman, it is automatically chosen from a variety of measuring instruments which one of them is to be used for a specific task. If the worker does not have sufficient qualification and/or no appropriate measuring instrument is available, other personnel currently present at the construction site may be requested.

Another parameter, which is also assigned to the measuring tasks, relates to the measurement tolerance permissible in the given measuring task. If the tolerance is very small and the measurement has to be realised very precisely, the system will choose a measuring instrument depending on availability and/or measuring staff depending on availability and qualification.

Under consideration of all these interdependencies, the system according to the invention provides checking instructions in the context of the measuring tasks. The measuring instructions may comprise

- a checking means, e.g. measuring instrument (in particular indicated by an identification number),
- a measuring staff (e.g. indicated by his name) who is determined to perform the check(s) or measurement(s),
- a feature to measure,
- locations of said checking means, said measuring staff and said feature, and/or
- directives on how specifically to perform the measurement.

The detailedness of these instructions may also be chosen by the system dependent on the worker's qualification. The instructions show up on the mobile device and serve as a walk-through manual.

The invention relates to a method for providing checking instructions on a mobile device of a worker on a construction site, wherein the mobile device is connected to a server, the mobile device and the server being part of a construction site management system, wherein work packages are assigned to the worker by the server, with the steps performed by the mobile device: obtaining a progress report (41) from the worker, the progress report relating to the progress of a work package, and transmitting the progress report to the server, and with the steps performed by the server: retrieving a checking plan (42) from the server based on the progress report, and generating checking instructions (43) based at least in part on the checking plan, the checking instructions comprising information on what feature to check, where to check the feature, and directives on how to check the feature.

In one embodiment of the method according to the invention, the checking instructions additionally comprise at least one of the group of information: which worker to deploy for checking, and which checking means to utilise for checking.

In another embodiment of the inventive method, the server furthermore retrieves a checking means database (421) stored on the server, the checking means database comprising information on a plurality of checking means regarding at least an availability of the checking means within a construction site, in particular the location of the checking means within a construction site, a checking tolerance capability of the checking means, and worker qualification requirements for the usage of the checking means, wherein the step of generating the checking instructions is additionally based on said information of the checking means database.

According to another embodiment of the invention, the method further comprises the step performed by the server: retrieving a worker database from the server, the worker database comprising information on a plurality of workers with an assigned worker ID, the information regarding at least a qualification capability of the worker, in particular indicating an experience level regarding the usage of checking means, wherein the mobile device is assigned to the worker by an according worker ID, and wherein the step of generating the checking instructions is additionally based on said information of the worker database.

In an embodiment of the method according to the invention, the checking means may be one of a group of: a camera of the mobile device, a measuring instrument, and an element inherent to said feature.

In another embodiment of the method according to the invention, the checking instructions are displayed on the mobile device graphically or textually.

According to another embodiment of the invention, the method further comprises the step performed by the mobile device: referencing position and orientation of the mobile device relative to the construction site or a three-dimensional model of the construction site with position and orientation determining means, the model of the construction site particularly being retrievable from the server As an example of the graphical depiction, when the instructions comprise indications on where a feature is to check or measure, depending on the position and orientation of the mobile device, the location of the feature may be displayed in a live camera view on the display of the mobile device, or in a 3D model of the construction site displayed on the display of the mobile device.

The invention further relates to a construction site management system for providing checking instructions on a mobile device of a worker on a construction site, wherein the mobile device is connected to a server, wherein work packages are assigned to the worker by the server, wherein the mobile device is configured to obtain a progress report from the worker, the progress report relating to the progress of a work package, and transmit the progress report to the server, and wherein the mobile device or the server is configured to retrieve a checking plan from the server based on the progress report, and generate checking instructions based at least in part on the checking plan, the checking instructions comprising information on what feature to check, where to check the feature, and directives on how to check the feature.

In an embodiment of the construction site management system according to the invention, the checking instructions additionally comprise at least one of the group of information: which worker to deploy for checking, and which checking means to utilise for checking.

In another embodiment of the construction site management system according to the invention, the mobile device or the server is additionally configured to retrieve a checking means database from the server, the checking means database comprising information on a plurality of checking means regarding at least an availability of the checking means within a construction site, in particular the location of the checking means within a construction site, a checking tolerance capability of the checking means, and worker qualification requirements for the usage of the checking means, wherein the checking instructions are additionally depending on said information of the checking means database.

In yet another embodiment of the construction site management system according to the invention, the mobile device or the server is additionally configured to retrieve a worker database from the server, the worker database comprising information on a plurality of workers with an assigned worker ID, the information regarding at least a qualification capability of the worker, in particular indicating an experience level regarding the usage of checking means, wherein the mobile device is assigned to the worker by an according worker ID, and wherein the checking instructions are additionally depending on said information of the worker database.

In an embodiment of the construction site management system according to the invention, the checking means is one of a group of: a camera of the mobile device, a measuring instrument, and an element inherent to said feature.

In an embodiment of the construction site management system according to the invention, the mobile device is configured to display the checking instructions graphically or textually.

In yet another embodiment of the construction site management system according to the invention, the mobile device has position and orientation determining means and is configured to reference its position and orientation relative to the construction site or a three-dimensional model of the construction site, the model of the construction site particularly being retrievable from the server.

The invention further relates to a computer program product comprising program code which is stored on a machine-readable medium, or being embodied by an electromagnetic wave comprising a program code segment, and having computer-executable instructions for performing, in particular when run on a server or a mobile device of a construction site management system according to the aforementioned description, the steps of a method according to the aforementioned description.

BRIEF DESCRIPTION OF THE DRAWINGS

In the following, the invention will be described in detail by referring to exemplary embodiments that are accompanied by figures, in which.

DETAILED DESCRIPTION

Figure 1:
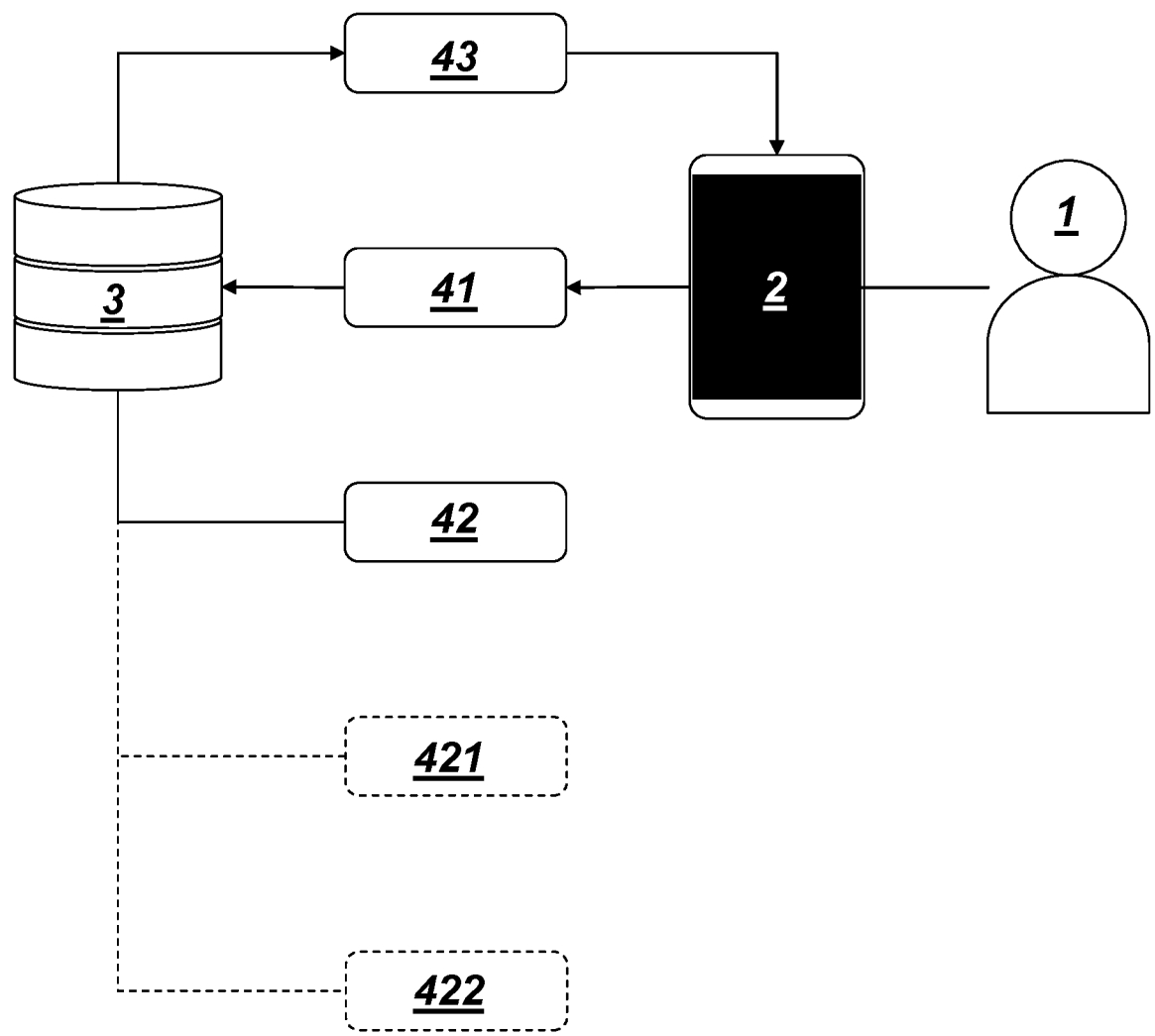
FIG. 1 shows a block diagram of a construction site management system in accordance with an embodiment of the invention.

FIG. 1 shows a block diagram illustrating the method and the system according to the invention. A worker 1 inputs into his mobile device 2 a progress report 41 which is sent to a server 3. As a response, the server 3 picks a matching checking plan 42 which particularly regards checking or measuring features of objects the worker 1 just built. Based on the checking plan 42, the server 3 is generating checking instructions 43 comprising information on what feature to check, where to check the feature, and directives on how to check the feature. The worker 1 following the checking instructions 43 may enter the results of the check or measurement results into the device 2 again which are then transmitted back to the server 1 where they are stored and made available to the network. Also, if the checking means allow, results may be sent to the server automatically without need for manual input; in this case a checking means, like a measuring instrument, is connected to the server as well. The progress report 41 may for example be the current stage of a work package, which the worker is either prompted to input or which he inputs unprompted into the user interface of the mobile device. For example, the progress report 41 may be input at the end of a working day, when the site manager needs an overview of all the work that has been done.

The checking plan 42 may comprise at least one checking task, in which e.g. a certain checking tolerance or measuring tolerance is required. Optionally, the checking plan 42 further lists at least one, in particular a plurality of alternative checking means, by which the required tolerance is achievable. Each checking means may have an ID number.

Optionally, the server has access to a checking means database 421, which stores the checking means by their ID number, and assigned thereto their availability (in particular comprising the exact location) within the construction site, a level of qualification of a worker which shall be necessary to accomplish the at least one checking task, and checking tolerances which the checking means is capable to satisfy. The checking instructions 43 are then customized and adapted to the circumstances, which may be the individual qualification of the worker (the worker qualification in this case me be transmitted by the mobile device), the availability of checking means and the checking tolerance.

Optionally, the server has access to a worker database 422, which may be stored on the server like the checking means database 421. The worker database 422 comprises workers by their ID number, and assigned thereto their qualification capability (qualification level), which indicates an experience level regarding the usage of certain checking means. In some cases, for example when a complex measuring instrument may be the checking means, the worker database 422 may be retrieved to check if the worker (identified by his mobile device, which automatically provides the worker ID) satisfy the qualification requirements. Also, the database may comprise position data of the workers at the construction site, so in case the worker does not satisfy said requirements, the system can order another worker to help out. The checking instructions 43 may be influenced by these criteria.

For the communication with the server, the mobile device 2 has wireless technology, such as bluetooth, wi-fi, and/or cellular. For obtaining and receiving information, the device 2 has a user interface adapted to guide a user/worker through work packages and their steps and sub-steps, as well as through checking tasks and their sub-tasks. To further increase the ergonomics, hints, tips and manuals may be retrieved in the user interface. To further increase convenience, the device 2 may have a touch screen, such as known from smart phones or tablets, by which a worker 1 can navigate through the hierarchy of the user interface. The checking instructions may be designed like a check list, as a plain text, or in a graphical way, like showing the worker in a 3D model or in a live image (augmented reality) of a camera of the mobile device the exact location of a feature to check. For the graphical displaying, the device may be needed to reference relative to the construction site or a 3D model (e.g. CAD) of the construction site.

The following figures show an exemplary user interface of a mobile device 2 as part of the construction management system according to the invention.

Figures 2A, 2B:
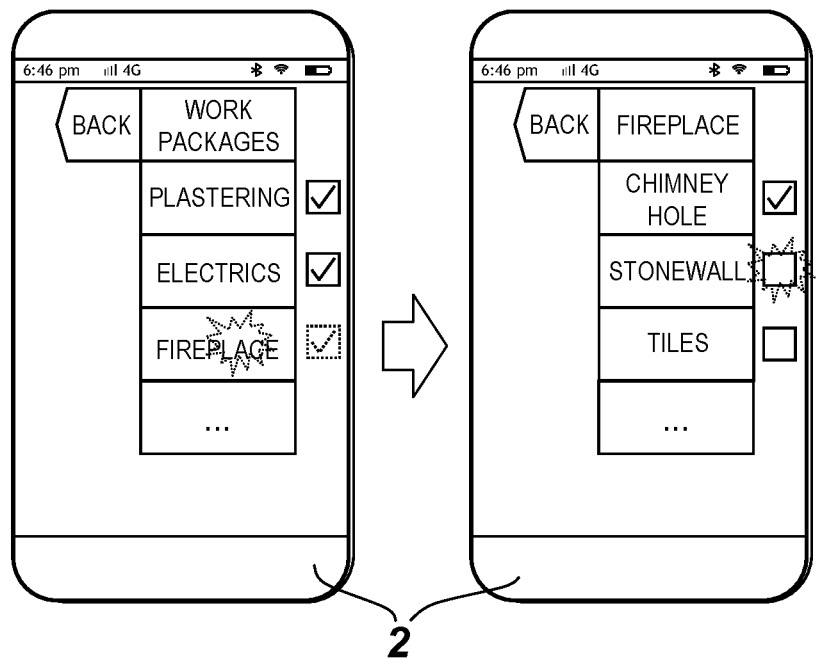
FIGS. 2A, 2B show a user interface of a mobile device as being part of a construction site management system in accordance with an embodiment of the invention.

FIGS. 2A and 2B each show a snapshot to illustrate an exemplary input workflow of a worker to provide a work package progress report 41 (see FIG. 1). It is indicated in FIG. 2A that a worker 1 taps on the screen of the device 4 at the button "FIREPLACE" which has a greyed tick next to it, stating that not all, but part of this work package is done. Other exemplary work packages already done are illustrated above said button "FIREPLACE". FIG. 2B shows a menu regarding the work package "FIREPLACE" which comprises work steps "CHIMNEY HOLE", "STONEWALL" and "TILES", of which only the "CHIMNEY HOLE" as already accomplished. It is to be assumed that a worker now has finished work step "STONEWALL" and he ticks the box next to said button. By this ticking, the management system is updated by the server 3 (see FIG. 1) receiving the information that the work step "STONEWALL" is accomplished.

After receiving the status information on the progress of work, the server 3 of the site management system directly chooses (e.g. from an according 1:1 correlation checking plan database stored on the server) the checking plan linked to the work steps and/or work packages that have been finished. Through an identification number of the mobile device 2 or of the worker 1 transmitted by the device 2, the system can comprehend who exactly has done the job and who exactly is now supposed to do the measuring task.

The choice of measuring tasks and measuring steps displayed upon this request may be provided fully or limitedly depending on the worker's skills/qualification. The measuring tasks and measuring steps displayed are customised by the system based on the worker's skills/qualification. For example, for a novice worker a more detailed explanation on how to measure may be displayed, or the choice of measuring instrument/checking means (in due consideration of the permissible checking tolerance) may be influenced by the worker's skills/qualification. If a measuring task may only be feasible by a more experiences craftsman, the task is blocked and it is indicated that an arrangement has to be made with an experiences worker nearby. Alternatively, the system may automatically choose a worker and notify him by sending a message to his mobile device. In this case the experienced worker would finish the measuring steps or tasks with help of his device and once the measuring steps or tasks are finished, they would also be indicated "done" (with a check) on the mobile device 2 of the layman worker who initially finished the work package or work steps triggering the measuring task.

Besides the given tolerances for the measuring task and the worker's skills/qualification, the choice of checking means (e.g. measuring instruments) is furthermore dependent on the availability of the measuring instruments. For this purpose, a priority list of measuring instruments may be deposited in the database. If a more prioritised instrument is not available or too far away (considering the working time to obtain the instrument), the system may choose and display the closest prioritised instrument in the list.

Figures 3A, 3B:
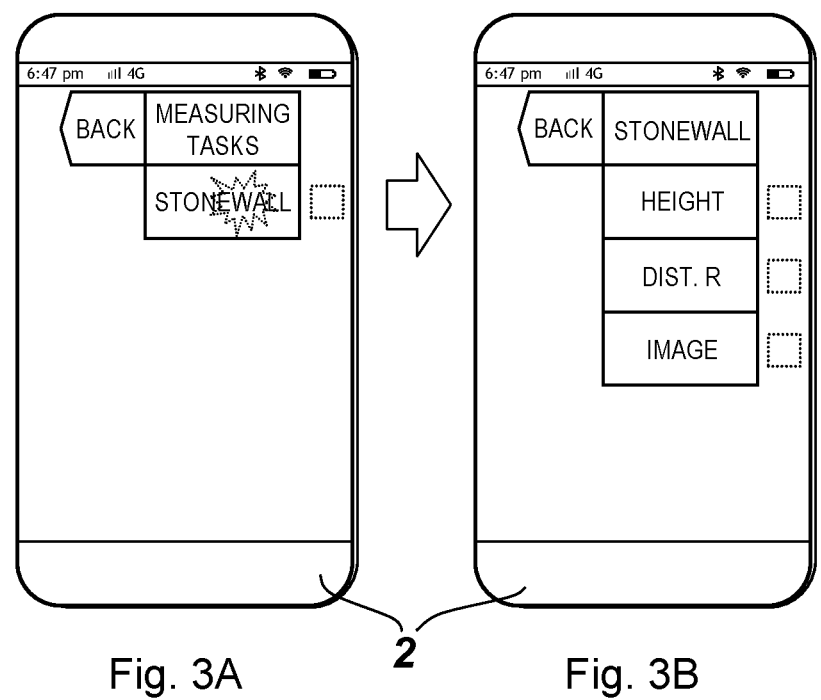
FIGS. 3A, 3B show a user interface of a mobile device as being part of a construction site management system in accordance with an embodiment of the invention.

FIGS. 3A and 3B illustrate the user interface of the mobile device 2 when in the measuring task menu, which may also be called checking task menu (if a feature is to be checked and not specifically measured). The measuring task menu automatically shows tasks to do, based on the input regarding the work package progress. So in this example, it has been indicated by a worker (according to FIG. 2B) that the work step "STONEWALL" of the work package "FIREPLACE" has been finished. This triggers the system to provide a measuring task "STONEWALL" comprising the measuring steps "HEIGHT", "DIST. R" and "IMAGE", according to FIG. 3B. Linked to these measuring steps are detailed information made visible when the steps are called up by tapping the respective button. As indicated in the FIGS. 3A and 3B, measuring tasks and measuring steps have tick boxes as well; however these are not manually selectable. The management system will mark them done when a valid measuring result has been received. FIGS. 4 to 7 illustrate exemplarily, how the user interface may guide the worker through the three measuring steps of FIG. 3B.

Figure 4:
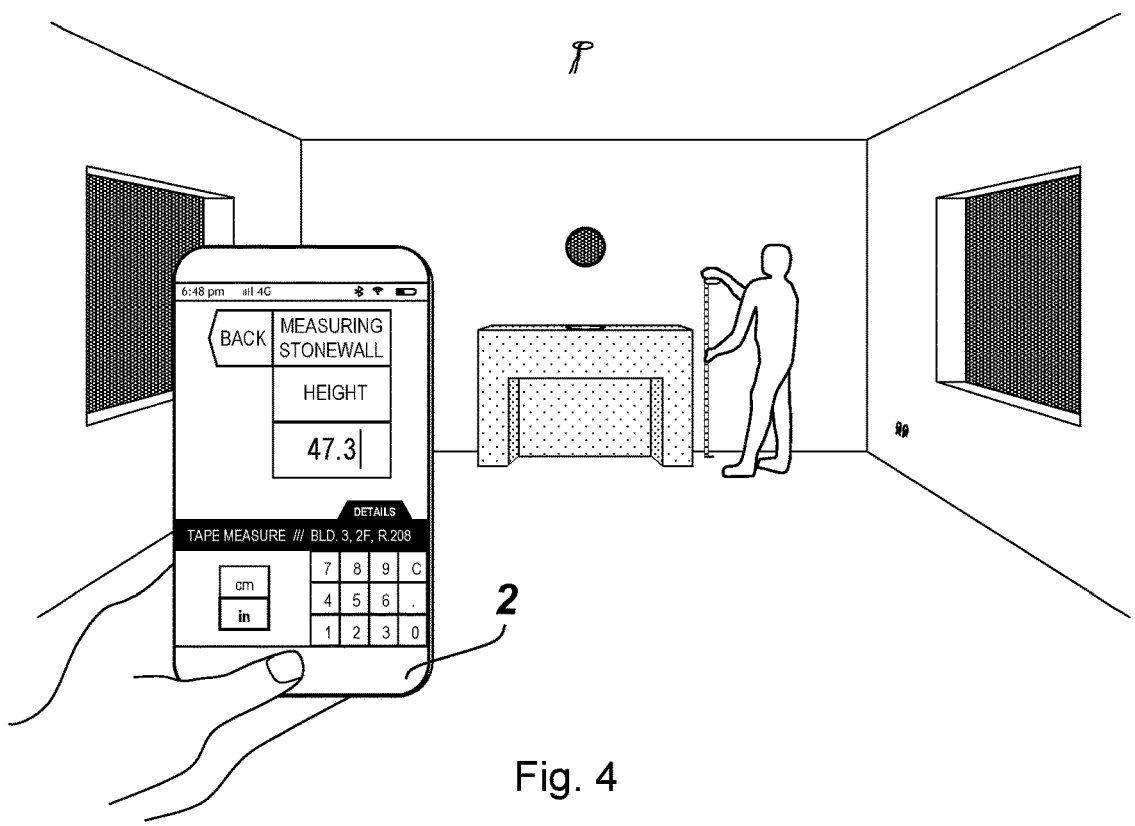
FIG. 4 shows an exemplary scene at a construction site and the usage of a construction site management system according to an embodiment of the invention.

FIG. 4 shows a first exemplary scenario, wherein the first measuring step shown in FIG. 3B has been picked by the worker. He is now instructed to use a tape measure which can be found in building 3, second floor, room 208. Details, such as a directives where exactly to apply the tape measure or information on what action to avoid in order to achieve a sufficiently precise measuring result, may be additionally displayed when the worker taps on "DETAILS". After the measurement the worker is prompted to input the result e.g. by use of an overlaid keyboard.

Figure 5:
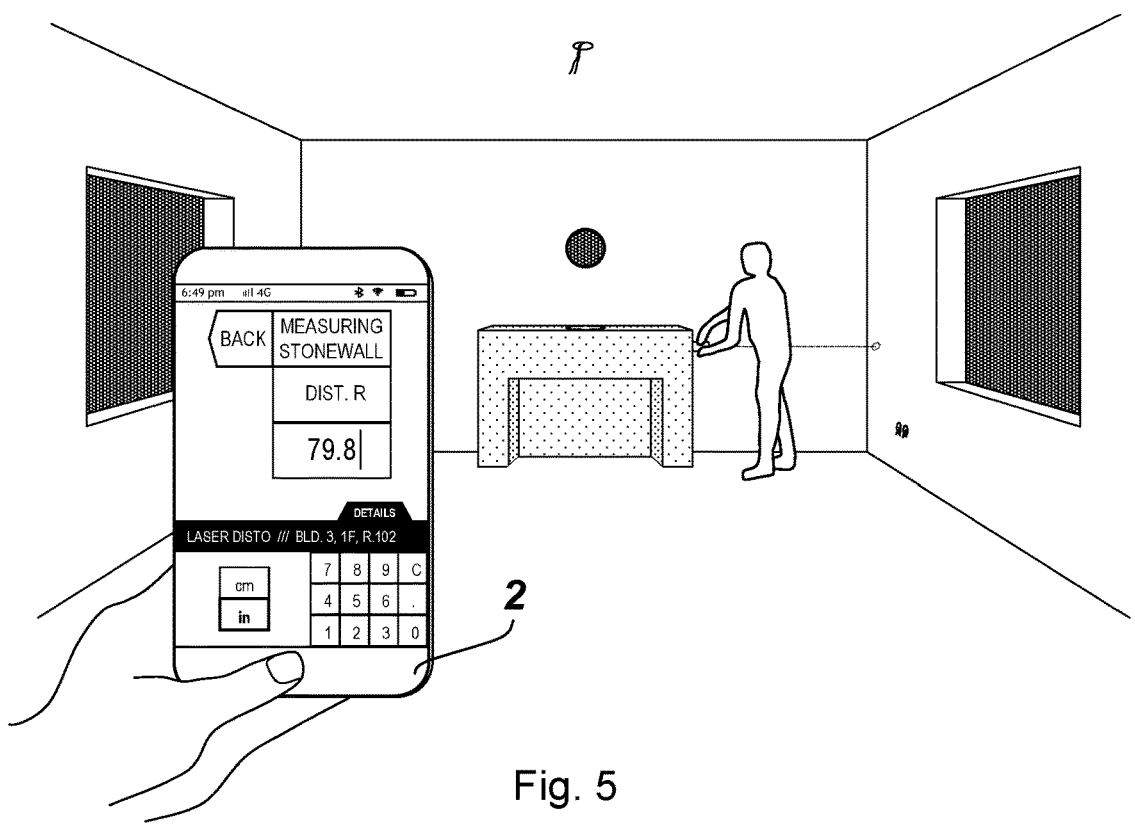
FIG. 5 shows another exemplary scene at a construction site and the usage of a construction site management system according to an embodiment of the invention.

FIG. 5 shows a second exemplary scenario, wherein the second measuring step shown in FIG. 3B has been picked by the worker. The worker is required to measure the distance of the right end of the fireplace stonewall to the right room wall. A laser distancemeter required for this measuring step is to be found in building 3, first floor, room 102, as displayed above the keyboard. Again, under "DETAILS" the worker will find instructions, e.g. on how to position the measuring instrument and how to handle it. Once the result is typed in, it is sent to and stored on the management system server.

Figure 6:
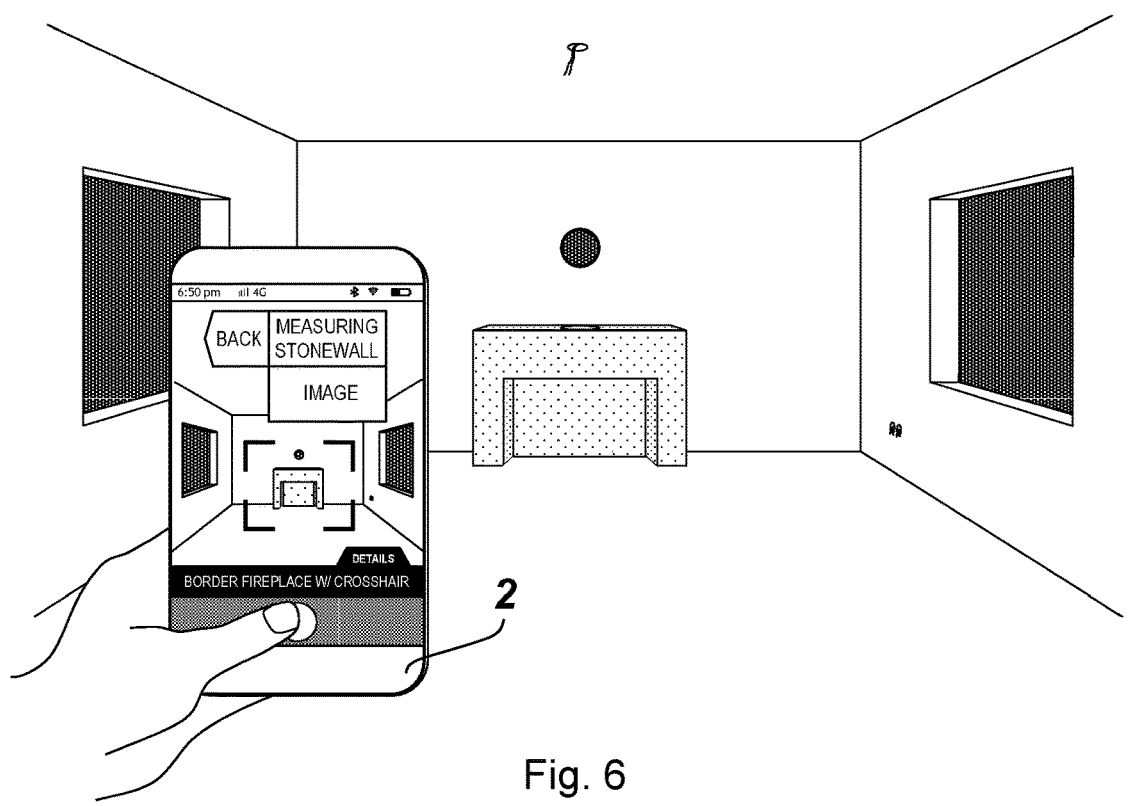
FIG. 6 shows yet another exemplary scene at a construction site and the usage of a construction site management system according to an embodiment of the invention.

FIG. 6 shows a third exemplary scenario, wherein the third checking step shown in FIG. 3B has been picked by the worker. For appearance check-up, a camera photo may be requested by the server, e.g. to enable a manager to check the work quality on the basis of the image. When tapping on "IMAGE" when in the menu page according to FIG. 3B in the user interface, a camera app of the mobile device 2 will automatically open. Again, an instructions bar shows up telling the worker to place the camera crosshair frame around the object of interest (fireplace). In the "DETAILS" there may be annotations regarding light conditions and e.g. what necessarily needs to be recognisable. The system may as well be designed to automatically check by means of an algorithm check, if the image meets certain set requirements. Otherwise, the image is then transferred with wireless technology (e.g. wifi) to the server, where it can be accessed by the manager and/or other workers.

Results of measuring features may also be automatically derived from the image information. This may be realised with feature recognition by means of a camera of the mobile device 2, or with referencing the mobile device 2 relative to the environment and/or a 3D model of the construction site.

Figure 7:
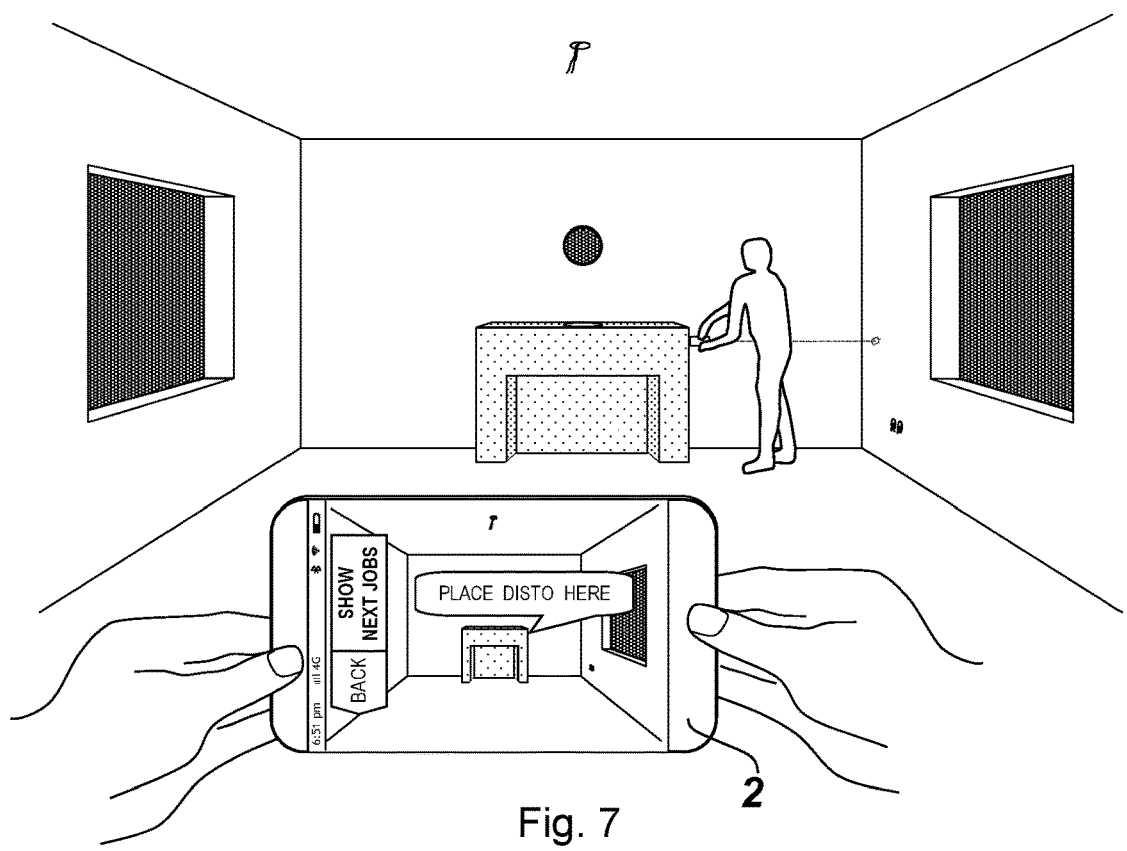
FIG. 7 shows another exemplary scene at a construction site and the usage of a construction site management system according to an embodiment of the invention.

FIG. 7 shows instructions on how to perform a measurement, the instructions being displayed on a mobile device 4 comprised by a construction site management system according to the invention. For this, the mobile device 2 displays either a live image with means of a camera built in to its back, or it displays a 3D model of the construction site, wherein the model may be requested by the server where the model is kept updated in real time. Depending on how the mobile device 4 is positioned and oriented by the worker 1, the model on the display is oriented accordingly, such that a worker watching the display always recognizes a correspondence in the real world. Hence, when the mobile device is oriented straight towards the fire place, the 3D model on the display is aligned such that the middle of the display shows the 3D element of the fire place.

For this to happen, the mobile device 2 may reference itself relative to the environment by means known from prior art. Such means may comprise gyro sensors, IMUs, radio transmission, compass, GNSS, or camera image processing, such as image resection, SLAM, feature matching or structure from motion. This referencing step would also be necessary to display the instruction bubble within the live image of the camera of the device 2. The bubble is linked to specific coordinate within the 3D model of the construction site and may therefore be displayed in the live image as augmented reality, if the device referenced its position and orientation relative to the 3D model.

Alternatively, a referenced bubble displayed in the display being linked to a specific location may not necessarily regard a measurement, but also a function test. For example, a worker may be instructed to test a fire alarm by performing a certain action. The checking means then would literally be the hands of the worker, pressing a fire alarm button, or the checking means may be a lighter and a piece of paper to cause smoke and test the sensor of a fire alarm.

A bubble therefore may hint the worker at a fire box or a smoke sensor and instruct him to cause fume nearby in order to activate the fire alarm. This function test instruction may as well be displayed just as a textual instruction without a 3D indication within the 3D model of the construction site.

In a preferred embodiment of the invention, the measuring instrument, e.g. as embodied in FIG. 7 as a laser distance meter, is wirelessly communicating with the mobile device 2 and/or with the server 3 in order to provide a measurement result without need for typing it in manually.

The invention is illustrated with reference to some exemplary embodiments and it must be understood that numerous modifications and combinations of different features of the embodiments can be made. All of these modifications lie within the scope of the appended claims.

What is claimed is:

1. A method for providing checking instructions on a mobile device of a worker on a construction site, wherein the mobile device is connected to a server, the mobile device and the server being part of a construction site management system, wherein work packages are assigned to the worker by the server, the method comprising:
   obtaining a progress report from the worker at the mobile device, the progress report relating to the progress of a work package;
   transmitting the progress report from the mobile device to the server;
   retrieving a checking plan from the server based on the progress report;
   retrieving a checking instrument database from the server, the checking instrument database comprising information on a plurality of checking instruments regarding at least one of:
      an availability of the checking instruments within a construction site,
      a checking tolerance capability of the checking instruments, and
      worker qualification requirements for the usage of the checking instruments; and
   generating checking instructions based at least in part on the checking plan, the checking instructions comprising:
      which worker to deploy for checking,
      which checking instrument to utilize for checking,
      information of the checking instrument database,
      information on what feature to check,
      where to check the feature, and
      directives on how to check the feature,
   wherein the checking plan and checking instrument database is retrieved to the server and the checking instructions are generated by the server or the checking plan and checking instrument database is retrieved to the mobile device and the checking instructions are generated by the mobile device.

2. The method according to claim 1, further comprising retrieving a worker database from the server, the worker database comprising information on a plurality of workers with an assigned worker ID, the information regarding a qualification capability of the worker, wherein the mobile device is assigned to the worker by an associated worker ID, and wherein the step of generating the checking instructions is additionally based on said information of the worker database.

3. The method according to claim 1, wherein at least one of the plurality of checking instrument is at least one of:
   a camera of the mobile device;
   a measuring instrument, and
   an element inherent to said feature.

4. The method according to claim 1, further comprising displaying the checking instructions on the mobile device graphically or textually.

5. The method according to claim 4, further comprising referencing a position and an orientation of the mobile device relative to the construction site or a three-dimensional model of the construction site using a position and orientation determining instrument of the mobile device, the model of the construction site particularly being retrievable from the server.

6. A computer program product comprising programmable code which is stored on a machine-readable medium having computer-executable instructions for performing the steps of a method according to claim 1.

7. The method according to claim 1, wherein the checking instrument database includes information on the checking instruments regarding the location of the checking instruments within a construction site.

8. A construction site management system for providing checking instructions on a mobile device of a worker on a construction site, the system comprising:
   the mobile device;
   a server connected to the mobile device, wherein work packages are assigned to the worker by the server, wherein the mobile device is configured to:
      obtain a progress report from the worker, the progress report relating to the progress of a work package, and transmit the progress report to the server, and wherein the mobile device or the server is configured to:
      retrieve a checking plan from the server based on the progress report, retrieve a checking instrument database from the server, the checking instrument database comprising information on a plurality of checking instruments regarding at least:
- an availability of the checking instruments within a construction site,
- a checking tolerance capability of the checking instruments, and
- worker qualification requirements for the usage of the checking instruments, and generate checking instructions based at least in part on the checking plan, the checking instructions comprising information on:
- which worker to deploy for checking,
- which checking instrument to utilize for checking,
- information of the checking instrument database,
- what feature to check,
- where to check the feature, and
- directives on how to check the feature.

9. The construction site management system according to claim 8, wherein the mobile device or the server is additionally configured to:
retrieve a worker database from the server, the worker database comprising information on a plurality of workers with an assigned worker ID, the information regarding at least a qualification capability of the worker,
wherein the mobile device is assigned to the worker by an associated worker ID, and
wherein the checking instructions are additionally depending on said information of the worker database.

10. The construction site management system according to claim 8, wherein at least one of the checking instruments is one of:
a camera of the mobile device,
a measuring instrument, and
an element inherent to said feature.

11. The construction site management system according to claim 8, wherein the mobile device is configured to display the checking instructions graphically or textually.

12. The construction site management system according to claim 8, wherein the mobile device has a position and orientation determining instrument and is configured to reference its position and orientation relative to the construction site or a three-dimensional model of the construction site.

13. A construction site management system for providing checking instructions on a mobile device of a worker on a construction site, the system comprising:
the mobile device, wherein the mobile device is configured to display the checking instructions graphically or textually, and wherein the mobile device has a position and orientation determining instrument and is configured to reference its position and orientation relative to the construction site or a three-dimensional model of the construction site;
a server connected to the mobile device, wherein work packages are assigned to the worker by the server, wherein the mobile device is configured to:
obtain a progress report from the worker, the progress report relating to the progress of a work package, and
transmit the progress report to the server, and wherein the mobile device or the server is configured to:
retrieve a checking plan from the server based on the progress report, and
generate checking instructions based at least in part on the checking plan, the checking instructions comprising information on:
what feature to check,
where to check the feature, and
directives on how to check the feature.

14. The construction site management system according to claim 13, wherein the mobile device or the server is additionally configured to:
retrieve a worker database from the server, the worker database comprising information on a plurality of workers with an assigned worker ID, the information regarding at least a qualification capability of the worker,
wherein the mobile device is assigned to the worker by an associated worker ID, and
wherein the checking instructions are additionally depending on said information of the worker database.

15. The construction site management system according to claim 13, wherein at least one of the checking instruments is one of:
a camera of the mobile device,
a measuring instrument, and
an element inherent to said feature.

16. The construction site management system according to claim 13, wherein the checking instructions additionally comprise at least one of:
which worker to deploy for checking, and
which checking instrument to utilize for checking.

17. The construction site management system according to claim 16, wherein the mobile device or the server is additionally configured to:
retrieve a checking instrument database from the server, the checking instrument database comprising information on a plurality of checking instruments regarding at least:
an availability of the checking instruments within a construction site,
a checking tolerance capability of the checking instruments, and
worker qualification requirements for the usage of the checking instruments,
wherein the checking instructions are also depend on said information of the checking instrument database.

* * * * *